(12) United States Patent
Sridhar et al.

(10) Patent No.: US 11,805,015 B2
(45) Date of Patent: Oct. 31, 2023

(54) SYSTEM AND METHOD FOR INTENT BASED NETWORK SLICE ASSIGNMENT

(71) Applicant: Sandvine Corporation, Waterloo (CA)

(72) Inventors: Kamakshi Sridhar, Plano, TX (US); Nicolas St. Pierre, Waterloo (CA); Alexander Havang, Malmo (SE)

(*) Notice: Subject to any disclaimer, the term of this patent is extended or adjusted under 35 U.S.C. 154(b) by 0 days.

(21) Appl. No.: 16/940,627

(22) Filed: Jul. 28, 2020

(65) Prior Publication Data

US 2021/0194771 A1 Jun. 24, 2021

Related U.S. Application Data

(60) Provisional application No. 62/950,572, filed on Dec. 19, 2019.

(51) Int. Cl.
*H04L 41/0893* (2022.01)
*H04L 43/0829* (2022.01)
*H04L 43/16* (2022.01)
*H04W 24/02* (2009.01)

(52) U.S. Cl.
CPC ...... *H04L 41/0893* (2013.01); *H04L 43/0841* (2013.01); *H04L 43/16* (2013.01); *H04W 24/02* (2013.01)

(58) Field of Classification Search
None
See application file for complete search history.

(56) References Cited

U.S. PATENT DOCUMENTS 9,961,624 B1 * 5/2018 Zait .................. H04W 48/16
2018/0132117 A1 5/2018 Senarath et al.
(Continued)

FOREIGN PATENT DOCUMENTS

| EP | 3609129 A1 | 2/2020 |
| JP | 2018207190 A | 12/2018 |
| WO | 2018196685 A1 | 11/2018 |

OTHER PUBLICATIONS

ESTI GN ENI 001 V2.1.1, Experiential Networked Intelligence (ENI); ENI use cases (Year: 2019).*
(Continued)

*Primary Examiner* — Mohamed A. Wasel
*Assistant Examiner* — Mohammad Yousuf A. Mian
(74) *Attorney, Agent, or Firm* — Amarok IP Inc.; Neil W. Henderson

(57) ABSTRACT

A method for network slice assignment including: defining an intent for at least one network slice; selecting at least one network slice instance has capability to meet the intent; monitoring the selected network slice instance to determine whether the selected network slice instance is achieving the intent; and if the intent is not being met, reprioritizing at least one network slice instance in order to prioritize the selected network slice instance; if the intent is being met, continue monitoring the selected network slice instance. A system for network slice assignment including: a selection module configured to define an intent for at least one network slice and select at least one network slice; a monitoring module configured to monitor the selected network slice instance; an analysis module configured to determine if the intent is being met; and a reprioritization module configured to reprioritize at least one network slice.

18 Claims, 10 Drawing Sheets

(56) References Cited

U.S. PATENT DOCUMENTS

| | | | |
|---|---|---|---|
| 2019/0386878 A1* | 12/2019 | Chou | H04W 4/50 |
| 2020/0044943 A1* | 2/2020 | Bor-Yaliniz | H04L 41/0893 |
| 2020/0068430 A1* | 2/2020 | Chan | H04W 24/08 |
| 2021/0258941 A1* | 8/2021 | Chou | H04W 72/542 |
| 2021/0281997 A1* | 9/2021 | Chai | H04M 15/66 |
| 2021/0337555 A1* | 10/2021 | Fan | H04W 28/24 |
| 2022/0022090 A1* | 1/2022 | Schliwa-Bertling | H04L 41/0897 |

OTHER PUBLICATIONS

"3rd Generation Partnership Project; Technical Specification Group Services and System Aspects; Telecommunication management; Study on management aspects of communication services (Release 16)", No. V16.0.0, (Sep. 25, 2019), pp. 1-42, 3GPP Standard; Technical Report; 3GPP TR 28.805, 3rd Generation Partnership Project (3GPP), Mobile Competence Centre ; 650, Route Des Lucioles ; F-06921 Sophia-Antipolis Cedex ; France, URL: https://www.3gpp.org/ftp/Specs/archive/28_series/28.805/28805-g00.zip.
European Patent Office, EESR in corresponding EP20188320.4, dated Jan. 25, 2021.
Secretary, "output of UC draft from call 124", vol. ISG ENI Experiential Networked Intelligence, (Oct. 29, 2019), pp. 1-102. ETSI Draft; ENI(19)000245, European Telecommunications Standards Institute (ETSI), 650, Route Des Lucioles ; F-06921 Sophia-Antipolis ; France, URL: docbox.etsi.org/ISG/ENI/05-Contributions/2019/ENI(19)000245_output_of_UC_draft_from_call_124.docx, (Oct. 29, 2019) XP014356842.

* cited by examiner

| Preconfigured slices | Sub-Slice tuple | Configured Min Score | Configured Target Score |
|---|---|---|---|
| Slice 1 | c-p | 3 | 5 |
| Slice 2 | b-r | 3 | 4 |
| Slice 3 | a-q | 2 | 3 |
|  |  |  |  |
| Slice 200 | b-q | 3 | 5 |

| Active/assigned slices in the network. Network Slice Instance | Preconfigured slices Selected from Table 1 | Configured Min Score | Configured Target Score | Measured Min Score (*) | Measured Max Score (*) | Measured Median Score (*) | Health of the assigned network slice (*) |
|---|---|---|---|---|---|---|---|
| Column 1 | Column 2 | Column 3 | Column 4 | Column 5 | Column 6 | Column 7 | Column 8 |
| Network Slice Instance 2 | Slice 23 | 3 | 4 | 3.2 | 4.5 | 4.1 | A |
| Network Slice Instance 3 | Slice 45 | 2 | 4 | 1.4 | 3.1 | 2.3 | C |
| Network Slice Instance 4 | Slice 30 | 4 | 5 | 2.7 | 4.7 | 3.8 | C |
| | | 1 | 3 | 2.6 | 3.9 | 3.1 | B |
| | | 2 | 4 | 3.8 | 4.6 | 4.2 | A |
| Network Slice Instance 15 | Slice 67 | 2 | 5 | 2.5 | 3.3 | 2.8 | B |

FIG. 8

| Intent Met | Number of NSIs meeting the criteria |
|---|---|
| Column 1 | Column 2 |
| Above Target Scores | 12 |
| Between Minimum and Target Scores | 19 |
| Below Minimum Scores | 6 |
| Conclusion | Network is 'Moderately Congested' |

FIG. 9

SYSTEM AND METHOD FOR INTENT BASED NETWORK SLICE ASSIGNMENT

RELATED APPLICATIONS

The present disclosure claims priority to U.S. Provisional Patent Application No. 62/950,572 filed Dec. 19, 2019 which is hereby incorporated by reference.

FIELD

The present disclosure relates generally to computer networks. More particularly, the present disclosure relates to a system and method for intent based network slice assignment.

BACKGROUND

Network traffic continues to increase all over the world. Network operators continue to upgrade and improve their networks in order to continue to meet demand. As network operators move to newer network equipment, they are beginning to incorporate more 5G networks in an aim to meet customer demand. With the integration of 5G networks, network operators continue to monitor network characteristics such as Quality of Service (QoS), Quality of Experience (QoE) and the like, for their subscribers.

Generally speaking, network operators continue to look for ways to ensure that the network is providing the appropriate service to the subscribers. In some cases, where network operators are using 5G networks, the network operator may incorporate network slices into the delivered services. Networks operators wish to ensure the network, and the network slices, provide an appropriate service, service level and the like to the subscriber.

5G network slicing is intended to enable service providers to build virtual end-to-end networks tailored to meet the user expectations/requirements for specific applications such as video streaming, gaming, and the like. Resources within each network slice are typically allocated to deliver a predetermined Quality of Service, Quality of Experience or the like to the end user, for a specific application. Multiple network slices of one or more types may be supported for an end user.

It is, therefore, desirable to provide an improved method and system for network slice selection.

The above information is presented as general background information only to assist with an understanding of the present disclosure. No determination has been made, and no assertion is made, as to whether any of the above might be applicable as prior art with regard to the present disclosure.

SUMMARY

In a first aspect, there is provided a method for network slice assignment on a network, the method including: defining an intent for at least one network slice; selecting at least one network slice instance has capability to meet the intent; monitoring the selected network slice instance to determine whether the selected network slice instance is achieving the intent; and if the intent is not being met, reprioritizing at least one network slice instance in order to prioritize the selected network slice instance; if the intent is being met, continue monitoring the selected network slice instance.

In some cases, monitoring the selected network slice instance may include: determining a minimum score, maximum score and median score of the selected network slice instance; and comparing the minimum score, maximum score and median score to the defined intent.

In some cases, wherein the minimum score, maximum score and median score may be determined by analyzing network performance metrics.

In some cases, the network performance metrics may include: Throughput, Round-Trip-Time and Loss.

In some cases, the method for network slice assignment on a network may include: determining a network congestion level of the network; and selecting the at least on network slice instance based on the network congestion level.

In some cases, monitoring the selected network slice instance may include: determining a health of the Network Slice as a weighted average of measured scores over a predetermined interval sliding window.

In some cases, the method for network slice assignment on a network may include: monitoring the selected network slice instance over a predetermined time interval to determine performance analytics of the selected network slice instance; aggregating the performance analytics over the predetermined time interval; determining whether the aggregated performance analytics are above any predetermined threshold; and providing notification with respect to any aggregated performance analytics over the predetermined threshold.

In some cases, the performance analytics may be intended to measure the performance of the selected network slice instance compared to the intent for the selected network slice instance.

In some cases, reprioritizing at least one network slice instance may include allocating more resources to the selected network slice instance.

In some cases, reprioritizing at least one network slice instance may include deprioritizing at least one other network slice instance.

In some cases, deprioritizing at least one other network instance may include removing the at least one network slice instance by removing the assignment of hardware, software, security and other resources attributable to the slice.

In another aspect, there is provided a system for network slice assignment on a network, the system including: a selection module configured to define an intent for at least one network slice and select at least one network slice instance has capability to meet the intent; a monitoring module configured to monitor the selected network slice instance to determine whether the selected network slice instance is achieving the intent; an analysis module configured to determine if the intent is being met; and a reprioritization module configured to reprioritize at least one network slice instance in order to prioritize the selected network slice instance.

In some cases, the monitoring module may be configured to determine a minimum score, maximum score and median score of the selected network slice instance; and the analysis module may be configured to compare the minimum score, maximum score and median score to the defined intent.

In some cases, the analysis module may be further configured to determine a network congestion level of the network; and the selection module may be configured to select the at least on network slice instance based on the network congestion level.

In some cases, the analysis module may be further configured to determine a health of the Network Slice as a weighted average of measured scores over a predetermined interval sliding window.

In some cases, the monitoring module may be further configured to monitor the selected network slice instance over a predetermined time interval to determine performance analytics of the selected network slice instance; the analysis module may be further configured to aggregate the performance analytics over the predetermined time interval and determine whether the aggregated performance analytics are above any predetermined threshold; and the reprioritization module may be configured to provide notification with respect to any aggregated performance analytics over the predetermined threshold.

In some cases, the reprioritization may be is configured to reprioritize at least one network slice instance by allocating more resources to the selected network slice instance.

In some cases, the reprioritization module may be configured to reprioritize at least one network slice instance by deprioritizing at least one other network slice instance.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 8 illustrates a table showing health of network slice instances;

FIG. 9 illustrates a table showing a congestion state of a network;

DESCRIPTION

Generally, the present disclosure provides a method and system for network slice selection/assignment. Embodiments of the system and method are intended to define or retrieve an intent for a new network slice selection or assignment. The system is configured to determine a network slice instance that may achieve the intent based on, for example, network resources, network congestion, and the like. Embodiments of the system and method are intended to monitor some or all of the selected network slice instances in the network to determine whether the network slice instances are achieving their associated intent. If a selected network slice instance is not achieving the associated intent, the system and method may be configured to amend the priorities of at least one network slice instance to reprioritize the resources of the network. In some cases, embodiments of the system and method may further be configured to aggregate performance analytics of some or all of the network slice instances to determine whether any of the selected network slice instances is operating below a predetermined threshold.

Figure 1:
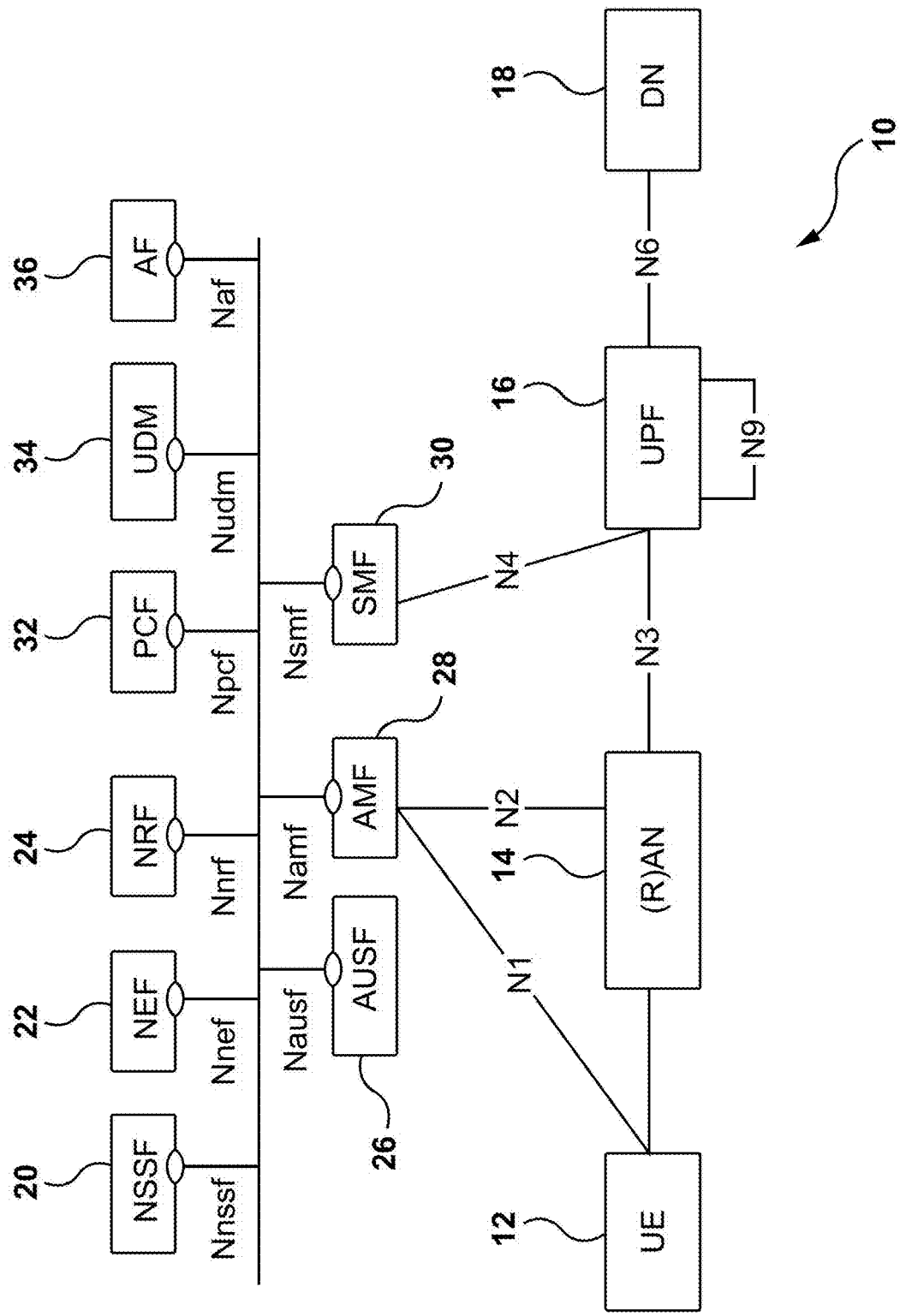
FIG. 1 illustrate an architecture of a computer network.

Computer networks, including 5G networks, generally aim to support a subscriber's desire to deliver a rich variety of high throughput (eMBB), highly reliable (URLLC), and low latency services. FIG. 1 shows a 5G Service Based Architecture of a computer network 10. Subscribers, via user equipment 12, such as laptops, mobile phones, personal computers, often connect to a Radio Access Network (RAN) 14. The RAN is connected to a User Plane Function (UPF) 16 which then connects to the Data Network (DN) 18. It will be understood that a 5G network may further include at least one Network Slice Selection Function (NSSF) 20, a Network Exposure Function (NEF) 22, a Network Repository Function (NRF) 24, Authentication Server Function (AUSF) 26, Access and Mobility Management Function (AMF) 28, Sessions Management Function (SMF) 30, Policy and Control Function (PCF) 32, Unified Data Management (UDM) 34, and Application Function (AF) 36.

For application packets to be delivered through a 5G network between source and destination, three key elements are typically involved, namely the UPF, the SMF, and the AMF. The UPF 16 facilitates user plane operations including packet routing and forwarding, interconnection to the Data Network, policy enforcement and data buffering. The SMF 30 is responsible for creating, updating and removing Protocol Data Unit (PDU) sessions and managing session context with the User Plane Function (UPF). The AMF 28 supports connection management, mobility management, access authentication and authorization, security context management, and the like. Other functions namely NEF, UDM, and the like, enable various other functions to support the operation of the 5G network Network Slicing is a mechanism for 5G networks that is intended to serve vertical industries with widely different service needs or Key Performance Indicators (KPIs), which may include latency, jitter, reliability, capacity and the like, as well as security, mobility, energy efficiency and the like. A Network Slice (NS) is a set of resources preconfigured to help meet KPIs to support the QoE or the like for an application flow or service. A Network Slice is intended to be a complete logical network partition including Radio Access Network (RAN) and Core Network (CN) that provides a plurality of network capabilities, which may vary from slice to slice. Distinct RAN and Core Network Slices can be available for 5G networks. A device, for example a UE 12, may access a plurality of Network Slices simultaneously through a single RAN.

Network slicing is intended to allow for a plurality of logical networks to be created on top of a common shared physical infrastructure. Network slicing allows networks to be logically separated, with each slice providing customized KPI based connectivity, while all slices continue to run on the same, shared physical infrastructure.

Slices are generally intended to be preconfigured. When a User Equipment (UE) or Application makes a request for a network slice, a slice is selected from one of the preconfigured network slices. A deployed network slice is called a Network Slice Instance (NSI). A NSI consists of one or more deployed Virtualized Network Function (VNF) instances and associated resources (for example, compute, storage, RAN scheduler, networking resources, and the like).

Conventionally, a slice selection would be made based on a best effort selection of a slice that is assumed to meet the service requirement based on anecdotal or empirical based configuration of resources which may or may not be capable of meeting the actual service KPIs over time, and usage patterns.

A typical conventional system might select the first available slice for a given service and use that slice for the entire duration of the flow without critically evaluating which specific slice would best meet the Quality of Experience for the flow. Further, typical conventional solutions do not assess upfront how many slices are needed to deliver an appropriate Quality of Experience for that flow, and do not generally measure whether the slice is indeed delivering the Quality of Experience expected from the slice, or the like.

Embodiments of the system and method detailed herein are intended to select Network Slices based on a Network Operator's described intent for the slice and, in some cases, other factors such as observed network congestion state, then monitor the KPI performance of the slice and raise alerts if or when the desired intent is not met.

Figure 2:
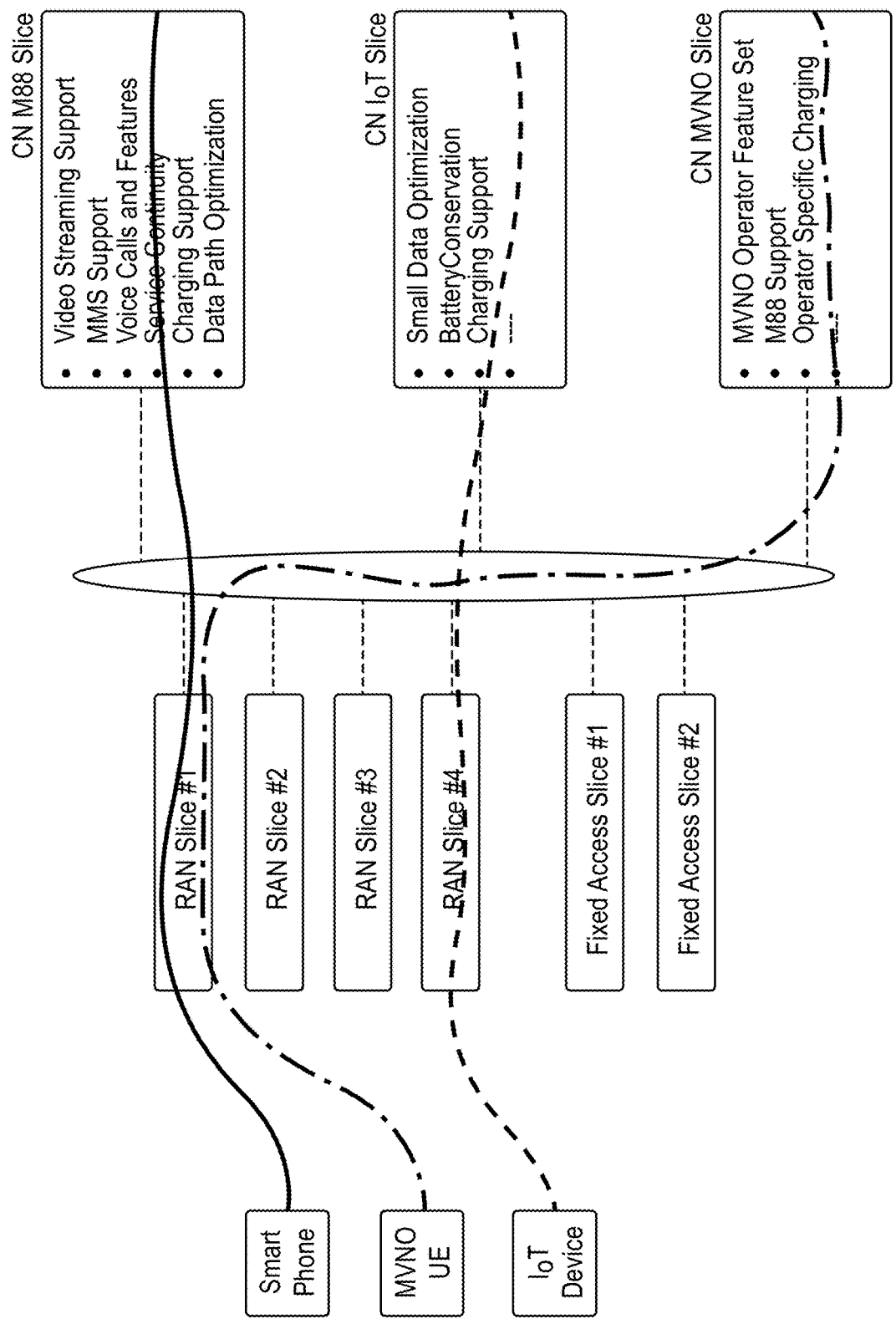
FIG. 2 illustrates a diagram of typical Network Slice Instances.

FIG. 2 illustrates an example of various network slice instances. One slice may be configured for evolved Mobile Broadband (MBB) services providing access to LTE, evolved LTE and NR devices. Other slices may be configured for an industry application with an optimized core network control plane, different authentication schemes, lightweight user plane handling and the like.

During the instantiation, configuration, and activation phase of a new Network Slice (NS), a set of 3GPP-defined control plane and user plane core network functions, such as the AMF, the SMF, and the UPF (and potentially even gNBs) are chosen, instantiated, and configured for a given network slice. Suitable resources of the cloud infrastructure required for these Network Functions (NFs) are allocated to create network slices, in that each network slice is preconfigured with a set of resources. Slices may also be assigned on-demand to a device if there are network slices available in the network. Once a Network Slice is created, then Network Slice Instances can be invoked for a given service. It is intended that the Network Slice assignment and reallocation should have no or minimal impact on traffic flows and services in other NSIs on the same network. Network Slices' resources can also be instantiated in isolation with a share-nothing model to deliver enterprise or security based services in isolation of other resources (compute, network, storage)

Figure 3:
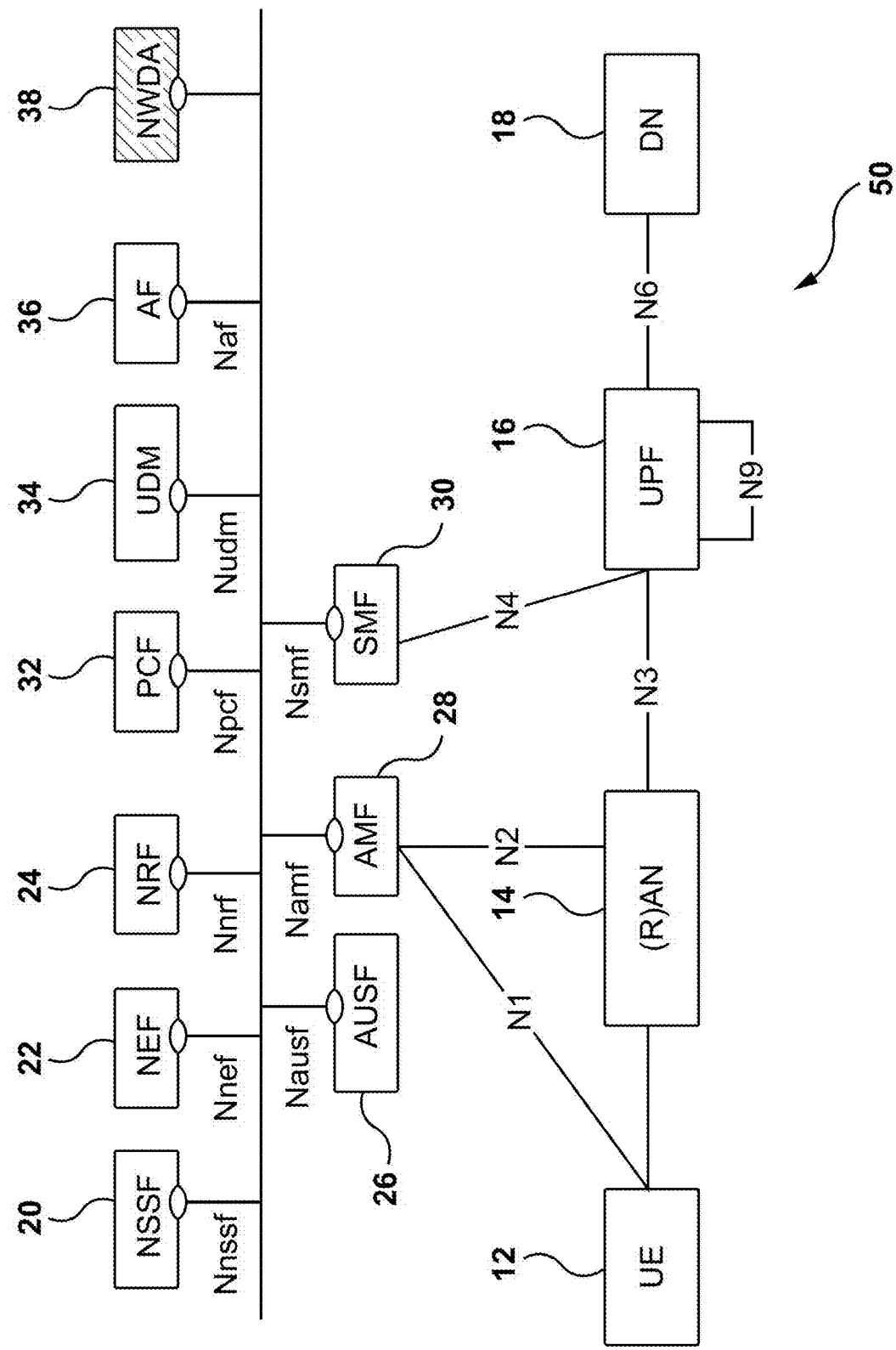
FIG. 3 illustrates an architecture having a system for network slice selection according to an embodiment.

FIG. 3 illustrates a network 50 including an embodiment of a system 100 for network slice selection. The NSSF is configured to enable a Network Slice Instance (NSI) based on a request. Network Slice selection by the NSSF 20 can be supported by methods detailed herein and performed by the system. The system 100 may be resident in the NSSF 20 or another entity, such as, a Network Data Analytics (NWDA) function 38 as detailed herein.

The Network Slice Selection Function (NSSF) 20 may consult the Network Data Analytics (NWDA) function 38 and assign a Network Slice Instance. The slice allocation function may reuse an existing NS or create a new NS to satisfy the allocation request.

Figure 4:
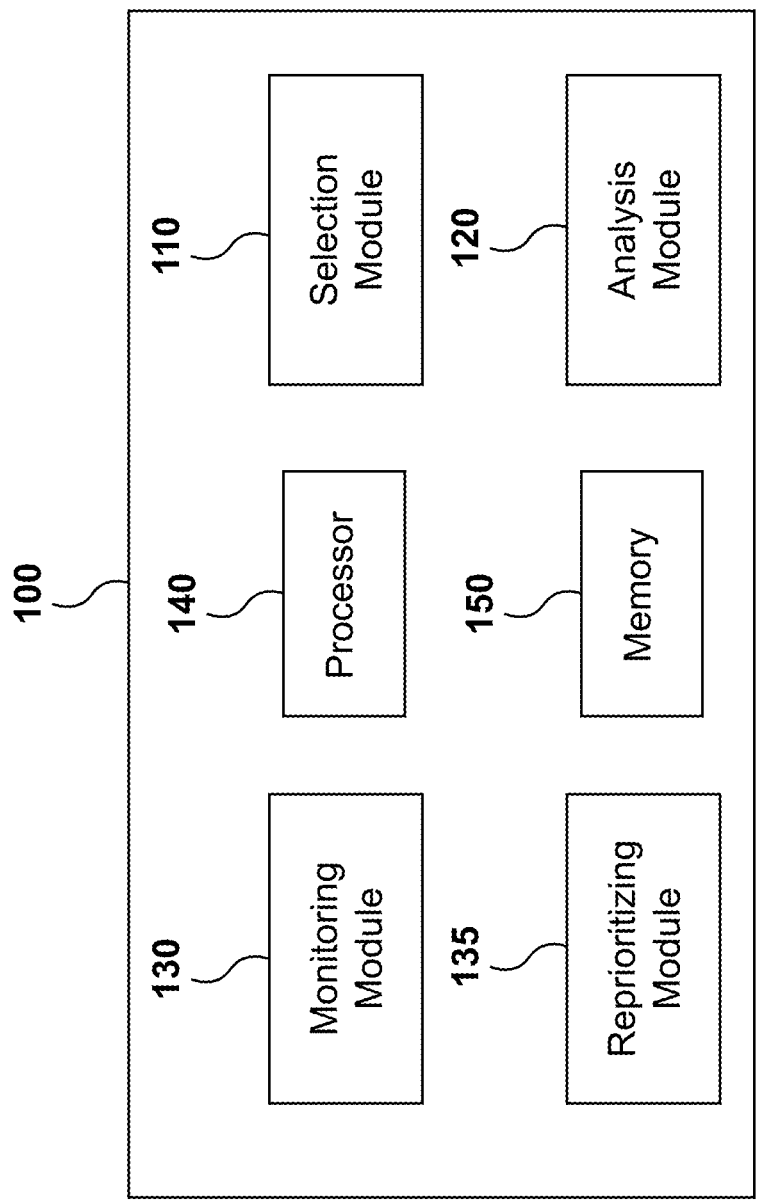
FIG. 4 illustrates a system for network slice selection according to an embodiment.

FIG. 4 illustrates an embodiment of a system 100 for network slice selection according to an embodiment. The system includes a selection module 110, an analysis module 120, a monitoring module 130, a reprioritizing module 135, at least one processor 140 and at least one memory 150 component. The system is generally intended to reside on the core network but may be distributed. For example, the modules, including the processor 140 and memory 150, are in communication with each other but may be distributed over various network devices or may be housed within a single network device. The system is intended to receive information from the computer network equipment that allows the system to determine traffic flow information, including application type.

The monitoring module 130 is configured to monitor the health of at least one network slice instance on a periodic basis. In a specific example, the monitoring module may determine a min score, max score and median score of each network slice instance on a periodic basis, for example, every minute or other appropriate time period. These scores may be used to update a table stored in the memory component in order to track each network slice instance's performance/health. It will be understood that other intervals may be used.

Scores may be calculated by combining network performance metrics, for example Throughput, Round-Trip-Time, Loss and possibly other metrics to generate a score as a single metric. The relative weightings between these metrics may vary from one application category to another. For example, Video Streaming may weight Throughput more than Round-Trip-Time, compared to say a Gaming application, which may have different weightings. Furthermore, the combination of these metrics into a single score may be linear, non-linear, quantized, weighted, or other appropriate method.

The analysis module 120 may be configured to determine the health of the network based on the measurements with respect to health of each of the network slice instances determined by the monitoring module. The analysis module 120 may further be configured to determine if each of the network slices are able to achieve the intent of the network operator based on the scores associated with each network slice instance as determined by the monitoring module 130. The analysis module 120 may further be configured to determine the network congestion level of the network as detailed herein.

The analysis module 120 may further aggregate measurements to determine performance analytics of the network over time. In particular, the analysis module 120 may track the performance of a network slice instance and provide aggregated analytics with respect to how the network slice instance is generally performing. In some cases, the analysis module may be configured to determine, for example:

For how many instances in the past X days (configurable) was the slice intent met?
For how many instances in the past X days (configurable) was the slice intent not met?
For how many instances in the past X days (configurable) was the slice invoked?
For how many instances in the past X days (configurable) was the slice not invoked?
For how many instances during the busy hours in the past X days (configurable) was the slice invoked?
For how many instances during the busy hours in the past X days (configurable) was the slice not invoked?
What was the maximum time duration for which the slice was invoked in the past X days (configurable)?
What was the minimum time duration for which the slice was invoked in the past X days (configurable)?

It will be understood that other performance analytics may be determined and used. In some cases, the analysis module

120 may be configured to raise alarms if the slice intent was not met for more than a threshold number of instances in a predetermined period, for example, in the past number of predetermined days. In a specific example, alarms may be raised if the network slice intent in the previous week was not met for 20% of the time during the busy hour duration of those days. In another specific example, alarms may be raised if the network slice intent in the previous day was not met for 30% of the time during the busy hour duration of the previous day. As an example, the busy hour duration may be the peak two hours during the day when the traffic volume is the highest. In some cases, each day, the time of the busy hour may change, for example, 1-3 PM one day or 7-9 PM another day. It will be understood that the number of days and the threshold percentages are intended to be configurable.

The analysis module 120 may raise alarms, for example, by sending notification to an administrator of the network operator, sending audible cues, emails, text messages or other manner of notification if any of the performance analytics are not met for a predetermined threshold of instances in order for the network operator to have a better understanding of the operation of each of the network slice instances.

The selection module 110 is configured to select an appropriate network slice based on the available network slices, the current network health level and the desired intent of the operator as further detailed herein. The selection module 110 is configured to receive a predetermined intent for at least one network slice from the network operator. In some case, the selection module 110 may define an intent based on, for example, the overall intents of the operator, the intents of any other network slice, or the like. In some cases, the network operator may store intents for network slices in the memory component and the selection module 110 may be configured to retrieve the intent.

The reprioritizing module 135 is configured to reprioritize network resources if the analysis module 120 determines that at least one network slice instance is unable to meet the associated desired intent. In some cases, reprioritizing may include, increasing the priority of the underperforming network slice instance, decreasing the priority of at least one other network slice instance, removing a network slice instance that is not currently operating, or the like.

Conventionally, if has been difficult to determine if the assigned network slice instance (NSI) is achieving the intended performance and/or business outcome that it was supposed to deliver. While there are references to the Quality of Service or QoE of a network slice, there are generally no ways to evaluate how well the QoS or QoE of the slice measures against an intent/objective, and, in particular, the intent/objective of the network slice. In conventional systems, it is generally assumed at configuration time that the resources allocation will be sufficient, even if that is later proved not to be the case.

As such, it is desirable to intelligently allocate a new slice based on the requirements of the slice and the state of the network. Further, it is desirable to characterize the current state of the network performance by a similar or the same metric with which the health of the slice is determined.

Figure 5:
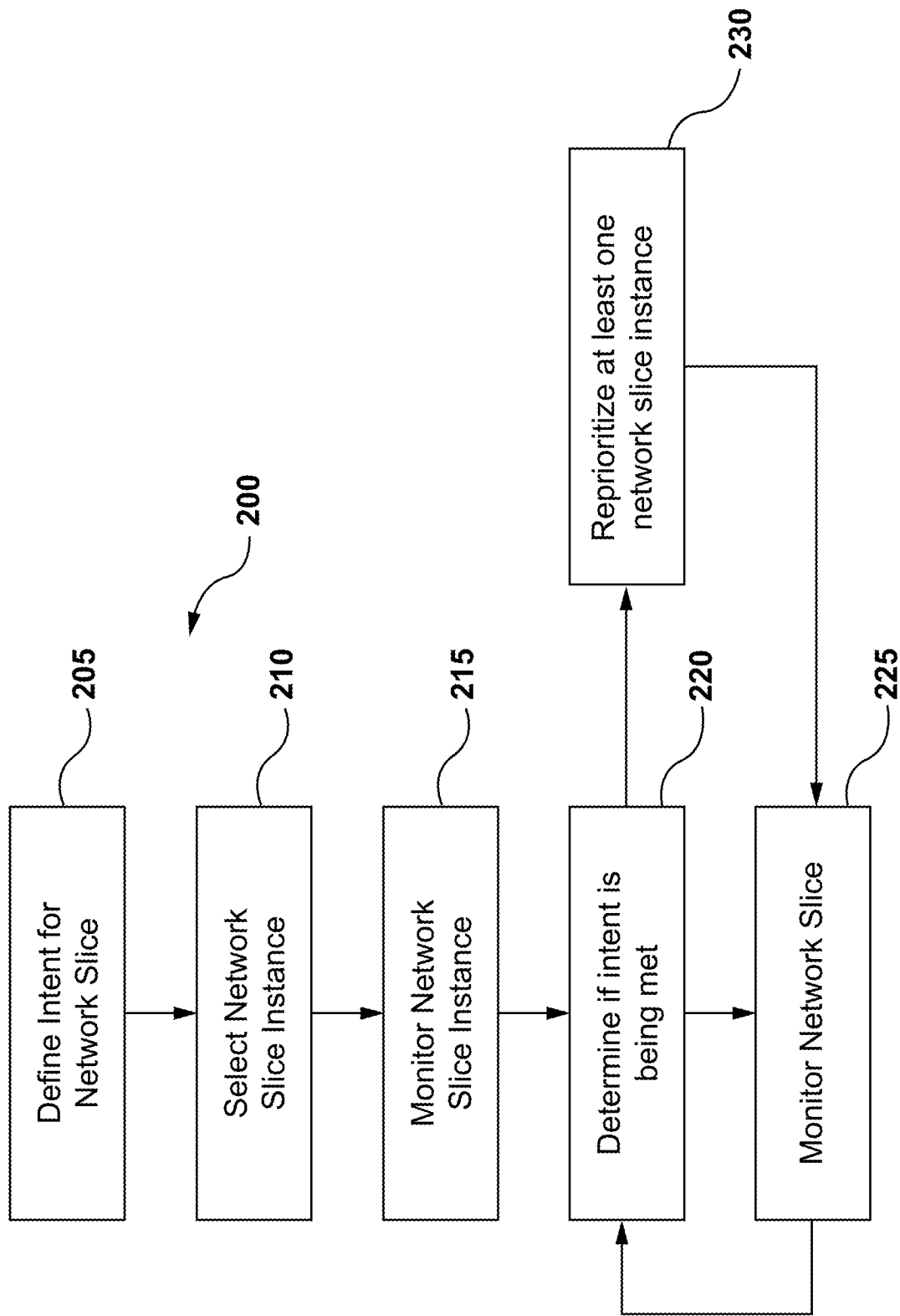
FIG. 5 illustrates a method for network slice selection according to an embodiment.

FIG. 5 illustrates a method 200 for network slice selection according to an embodiment. The selection module is configured to define or retrieve an intent for at least one network slice, at 205. The selection module 110 may then select at least one network slice instance that has capability to meet the intent, at 210. As noted herein, it is intended that each network slice instance has predetermined features and performance statistics associated with the network slice instance and the selection module 110 may be configured to select or configure the appropriate network slice instance based on the intent for the network slice instance as detailed herein.

At 215, the monitoring module 130 is configured to monitor at least a selected network slice instance. The monitoring module may then determine whether the selected network slice instance is achieving the intent, at 220. If the intent is being met, the monitoring module may continue monitoring the selected network slice instance, at 225. If the intent is not being met, the reprioritizing module 135 is configured to reprioritize at least one network slice instance in order to prioritize the selected network slice instance, at 230. In some cases, the monitoring module 130 may continue to monitor the performance of some or all of the network slice instances in order to determine ongoing performance analytics associated with each selected network slice instance. The analysis module 120 may then aggregate the performance analytics over a predetermined time period to determine if one or more of the network slice instances is not meeting performance analytic thresholds. The performance analytic thresholds may be preconfigured and are intended to determine if the network slice instance is performing well and/or meeting its associated intent over the predetermined time period.

Embodiments of the system and method detailed herein are intended to evaluate the performance of all allocated network slice instances (NSIs) and allocate slice instances for incoming requests in an attempt to ensure that the allocated/selected NSIs can meet their target intent as specified by the Operator.

Embodiments of the system and method disclosed herein are intended to measure and characterize the performance of a plurality of, if not all, Network Slice Instances. Once measured and characterized, the analysis module 120 may compare results against an operator specified intent. The intent is intended to characterize a business objective and may be quantified by a score based on, for example, the method detailed herein. In this case, the higher the score the better the performance of the NSI at meeting the desired KPIs of the intent. In general, a different quantifiable measure may be used for Intent. The Intent may be characterized by a Score, as detailed herein, or by some other similar metric that considers one or more of the network performance characteristics of, for example, throughput, loss, latency, jitter and the like.

Embodiments of the system and method defined herein are intended to provide for a metric that characterizes the health/performance of a Network Slice Instance based on how well the Operator's intent of each of the plurality of NSI's is being met. The health of a Network Slice Instance may be used to determine a more general 'Health of the Network' that is intended to provide insight into the congestion state of the network.

Embodiments of the system and method detailed herein are intended to evaluate whether the existing NSI performance is adequate to meet the network needs, or whether it would be beneficial to dynamically modify the slice, for example, via the reprioritizing module 135. Further, the system and method may further evaluate the trend of NSI performance to establish a predictive model of NS capacity instantiation.

In particular, for a new Network Slice request, the selection module 110 can be configured to determine which slice to allocate or instantiate such that the performance for the traffic flow under review and all other flows can be measured against a business objective, referred to herein as an Intent. Further, embodiments of the system and method may determine how the Intent can be met such that the 'Health of the Network', sometimes referred to as the congestion level of the network, can be managed to operate as well as possible and, ideally, optimally.

Embodiments of the system and method detailed herein are intended to benefit network slices within, for example, a 4G RAN with a 4G core, 5G RAN and a 4G core and/or a 5G RAN with a 5G Core.

Conventional solutions traditionally examine an incoming service and allocate the slice from a resource pool of available network slices without considering the impact of allocating the slice on the rest of the network performance. This is unlike the present solution which is intended to determine slice allocation and/or reallocation for a new incoming service, based on whether or not the Intent for that slice is likely to be met, and, in at least some cases, additionally based on the current congestion state of the network.

Embodiments of the system and method described herein can provide for new network slice instance (NSI) assignment, via the selection module 110, slice performance verification, via the analysis module 120 and monitoring module 130, and allocation of additional NSIs when and if needed, via the selection module 110 and reprioritizing module 135. The system may be housed within the Network Data Analytics (NWDA), or may be housed in a standalone network device. The NWDA function is consulted by the Network Slice Selection Function (NSSF) over the Service Based Architecture in deciding which slice to allocate, and to periodically evaluate if the slice is meeting its Intent. Alternatively, the system may reside exclusively in the NSSF.

The system is configured to measure the performance of a network slice instance by determining a Score for each network slice instance. In some cases, the score may be a number between 0 and 5 with a score of 5 indicating highest quality, and a score of 0 indicating lowest quality. It will be understood that various scales or scoring mechanisms may be used, and the example illustrated here with scores ranging from 0 to 5 may easily be modified with a different scale. The determination of the score number is based on how well the throughput, loss, latency and the like criteria for that service class is being met as detailed herein.

Ideally, every possible predefined network slice instance (NSI) is allocated an Intent Minimum Score and an Intent Target Score. In some cases, the operator may assign a minimum score and an intent target score based on the desired QoE or the like for each slice. These scores are intended to bind the performance expected of the network slice instance. The Intent Minimum Score refers to the 'minimum' Quality of Experience that the slice can deliver even when there is congestion in the network. The Intent Target Score refers to the 'highest' Quality of Experience that the slice can deliver when the congestion levels in the network are low or manageable. The Intent Minimum and Intent Target scores can be based on calibrating the expected performance through prior end-end testing and 'Experiential analysis' of the NSI. Experiential analysis is the impact of network performance characteristics on the end user Quality of Experience metrics. The perception of Quality of Experience is typically a subjective measure and may be correlated to varying degrees to the Quality of Service delivered by the network. In other words, improving QoS by say 20% may increase the QoE by only 5% for certain applications, or 40% for some other applications Embodiments of a method for network slice allocation are detailed herein. A new slice is picked (for example, by the AMF in consultation with the NSSF) from a catalog of available slice choices. In some cases, the number of choices may be finite and may depend on how the operator has previously provisioned their network slices. It is desirable to provide for a slice assignment that is intended to provide for a particular level of the service/application Quality of Experience (intent) that the network slice instance can meet. However, given that various conditions can affect Quality of Experience, for example, the variability of radio conditions, network congestion, occasional failures (e.g. in the edge), higher transient congestion in the core network, and the like, there can be no absolute guarantees of conditions experienced by the network slice instance.

The selection of a network slice should generally be such that there is high confidence that a slice instance will meet the performance objectives/intent. Accordingly, the assignment of a new slice should account for how well the requirements for the slice would be met while optimally using the available network resources given the congestion levels in the network. While there may be several available slice choices, invoking the highest quality slice may end up severely affecting the QoE of the existing slice instances. Embodiments of the network slice selection method are described herein.

To determine the congestion levels in a network, as an example, two metrics can be defined and determined by the system, namely a 'Health of a Slice Instance' metric and a 'Health of the Network' metric. The 'Health of a Slice Instance' is measured periodically through a Score, and is intended to be a retrospective view, meaning that this metric is measured after a network slice is selected, for example, via the monitoring module and the analysis module. This metric is intended to capture how many instances the actual score exceeded the Intent Target Score, how many instances the actual score exceeded the Intent Minimum Score but did not exceed the Intent Target Score, and how many times, the network slice score was below the Intent Minimum Score. The 'Health of a Slice Instance' may indicate how well the slice is able to meet the QoE for that slice given the current congestion levels in the network. It is intended that measuring the 'Health of a Slice Instance' may also indicate the actual congestion levels in the network.

The 'Health of the network' measures a congestion level of the network as calibrated by Intent scores, and may be measured by the monitoring module 130 and analyzed by the analysis module 120. It is determined based on how often the measured score exceeded the Intent Target Score, exceeded the Intent Minimum Score but did not exceed the Intent Target Score, or how often the measured score was below the Intent Minimum Score. Accordingly, the network may be classified as, for example, either lightly congested, moderately congested, or heavily congested.

An embodiment of the method for network slice selection for a new slice may be described as follows. The selection module is configured to determine a target score (R_target) and a minimum score (R_min) for each new slice. If a network is highly congested, then the selection module may select a slice that is capable of delivering the requested minimum quality for that slice (R_min) without necessarily having to meet the target quality. If a network is lightly congested, then the selection module may select a slice that is capable of delivering the requested target quality for that slice (R_target).

The system is further configured to determine the performance of network slice instances, via scores, which may be measured periodically, for example, every minute, every 5 minutes, every hour or the like. If an existing slice does not meet the Intent of the Slice, then an alarm may be raised that may trigger one or more of various actions via the reprioritization module 135 that are intended to aid the situation, for example, slice reallocation, additional NSI allocation, or the like.

Embodiments of the system can be configured to measure the performance of the network slice instance and validate the performance of the network slice instance against the Intent of the slice. The Intent is expressed or predetermined by the operator and is intended to represent a business value for the operator for that slice as expressed by the score and may be saved in the memory component.

Embodiments of the system and method are intended to enable the Operator to quickly be alerted if the performance of the slice is no longer meeting the business need (intent). The system and method may automatically enable a new set of slice resources to be allocated in a way to minimally impact the performance of the network, while intending to ensure optimal resource allocation across the network. Embodiments of the system and method are further intended to enable the Operator to get a health check and trend the state of the network, based on whether the Intent for the various network slices is being met.

Embodiments of the system and method provide for new network slice instance (NSI) assignment, slice performance verification, and allocation of additional NSIs when needed.

An embodiment of the method for network slice selection can provide for end-to-end slice definition and may include selecting/choosing a network slice segment from a catalog of available network slices. A network slice that is activated is called a Network Slice Instance.

Figures 6, 7:
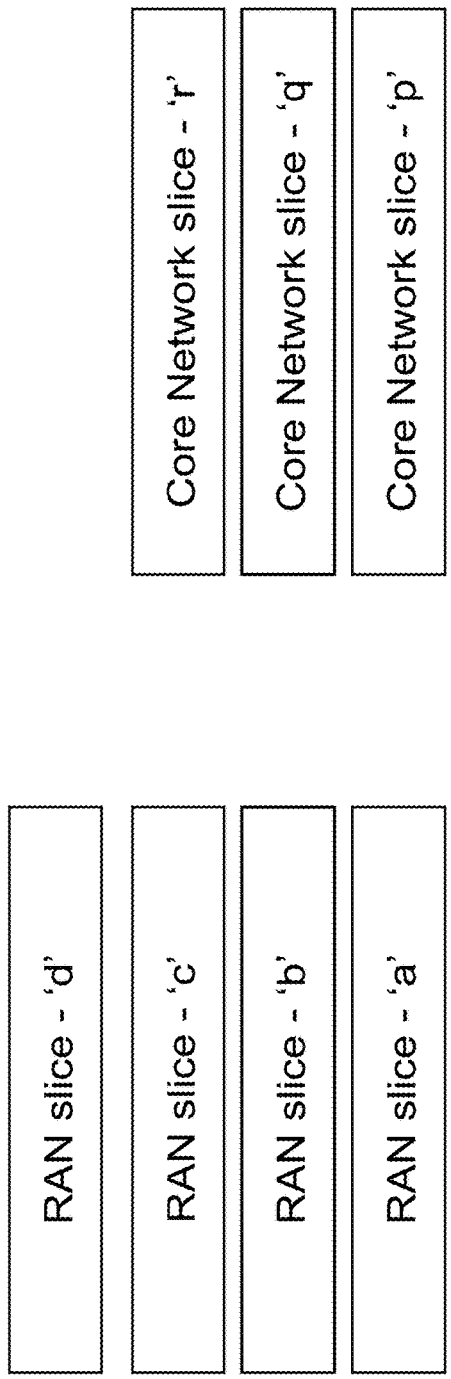
FIG. 6 illustrates network slice subnets according to an embodiment.
FIG. 7 illustrates a table showing intent for various network slices.

An end-to-end (e2e) network slice may include individual segments of network slices called network subnet-slice instances (NSSI). FIG. 6 shows an example of available network slice subnets. Different combinations of NSSI may be used to construct a network slice. For example, a network slice may include RAN slice 'c' with Core Network slice 'q'. Another network slice may be constructed as RAN slice 'a' and Core Network slice 'p', and the like.

FIG. 7 is a table illustrating an example catalog of available network slices (NS) and their respective Intent. Each slice is assigned a Minimum Score and a Target Score by a priori measuring the network slice performance for each network slice and identifying the Minimum Score and the Target Score that the network slice can deliver. The expectation is that the combination of network subnet-slice instances (NSSI), for a given network slice instance (NSI), will be able to closely match the Intent for that network slice.

The table in FIG. 7 is intended to be used in at least two ways. It is used to identify an appropriate set of network slices for a new service flow to help ensure that the overall intent of the slice is met. When the intent of the end-to-end slice is not met, the next step may be to detect and quickly reassign the appropriate network slice so that the end-to-end intent can be met. If the UE is exceeding the expected intent, a hard limit on UE/Service behavior can be set.

In a specific example, consider a 5G UE device that powers up. The 5G device finds a 5G cell and sets up a radio connection with a 5G gNB. Using the dedicated signaling connection with the gNB, the 5G device requests one or more subscribed network slices during the registration procedure. The 5G gNB selects an AMF that supports the network slices requested by the 5G UE device.

The 5G gNB is intended to become aware of the capabilities of the AMFs during the N2 setup with the AMF. The AMF may learn about the network slices subscribed by the device from the UDM. The AMF determines the allowed network slices for the device in the current registration area.

If the AMF itself may not support all the slices requested by the 5G UE device, then the AMF may request help from the Network Slice Selection Function (NSSF) to choose another suitable AMF. The NSSF provides one or more allowed network slices for the 5G device and works with the NRF to determine the AMF set for the NSI. The 5G UE device may then become aware of which network slices are allowed in the current registration area.

As embodiments of the method for network slice selection may be invoked by the NSSF in the above network, different set of slices that constitute, for example, an end-to-end slice may be instantiated to serve the 5G device. Thus, there will be an actual performance measurement for each Network Slice Instance when each instance is deployed.

Embodiments of the method for network slice selection may be intended to define and determine a metric called 'Health of a Network Slice'. In some cases, the Health of the Network Slice may be defined as the weighted average of the measured scores over the previous interval sliding window, minute by minute. In some cases, the interval sliding window may be 5 minutes, 10 minutes, 15 minutes, 30 minutes, 1 hour, or the like. The Health of the Network Slice is intended to determine the performance measurements (score) of the network slice. In a specific example, the weighted average may be binned into 3 categories as follows: Health of a Network Slice (A, B or C), wherein:

A: The weighted average measured score, weighted over the last say 15 minutes 'exceeds' the Target Score for that category;

B: The weighted average measured score, weighted over the last say 15 minutes 'exceeds' the Minimum Score for that category but is below the Target Score for that category; and C: The weighted average measured score, weighted over the last say 15 minutes 'does not exceed' the Minimum Score for that category.

FIG. 8 is a table that illustrates the Health of Network Slice Instances (active network slices) in an example live network. The fields Measured Min Score, Measured Max Score, measure Median Score, and Health of the Network Slice are intended to be updated periodically, for example: ever 30 seconds, every minute, every 5 minutes, or longer or the like.

FIG. 9 is a table that illustrates the congestion state of the network (Network Health) that is based on the input received from the table in FIG. 8. FIG. 9 is intended to illustrate an example of determining the overall network congestion. For example, if the majority of network slices have slice health A, then the network may be considered 'Lightly Congested'. If the majority of network slices have slice health B, then the network may be considered 'Moderately Congested'. If the majority of network slices have slice health C, then the network may be considered 'Heavily Congested'.

In some cases, the system may be configured to determine the network congestion status based on the following.

Let P be the number of times that the measured score exceeded the Target Score;

Let Q be the number of times that the measured score exceeded the Minimum Score but did not exceed the Target Score; and Let R be the number of times that the measured score was below the Minimum Score.

If the system determines that the highest number is P, then the network may be considered lightly congested. If the highest number is Q, then the network may be considered moderately congested. If the highest number is R, then the network may be considered heavily congested. Periodically the network slice performance is measured and compared against intent. When the system determines that it may be beneficial to reassign a new network slice, the system, for example via the selection module, may retrieve or consult a table, for example the table shown in FIG. 8, to identify the set of previously network slice sub-segments that most closely matched the overall end-to-end slice network performance. Of those subset of slice segments that may help meet the intended slice performance, a suitable slice is selected. Sometimes a range of network slices may be suitable, and any one of those network slices within the range could be selected. This process may be considered heuristic. If the choice of network slices does not meet the Intended Target or Minimum Score, then this learning is intended to be built into the system through a table, and a different set of network slices may be selected either in the next iteration or during the continuous evaluation process of the network performance.

Figure 10:
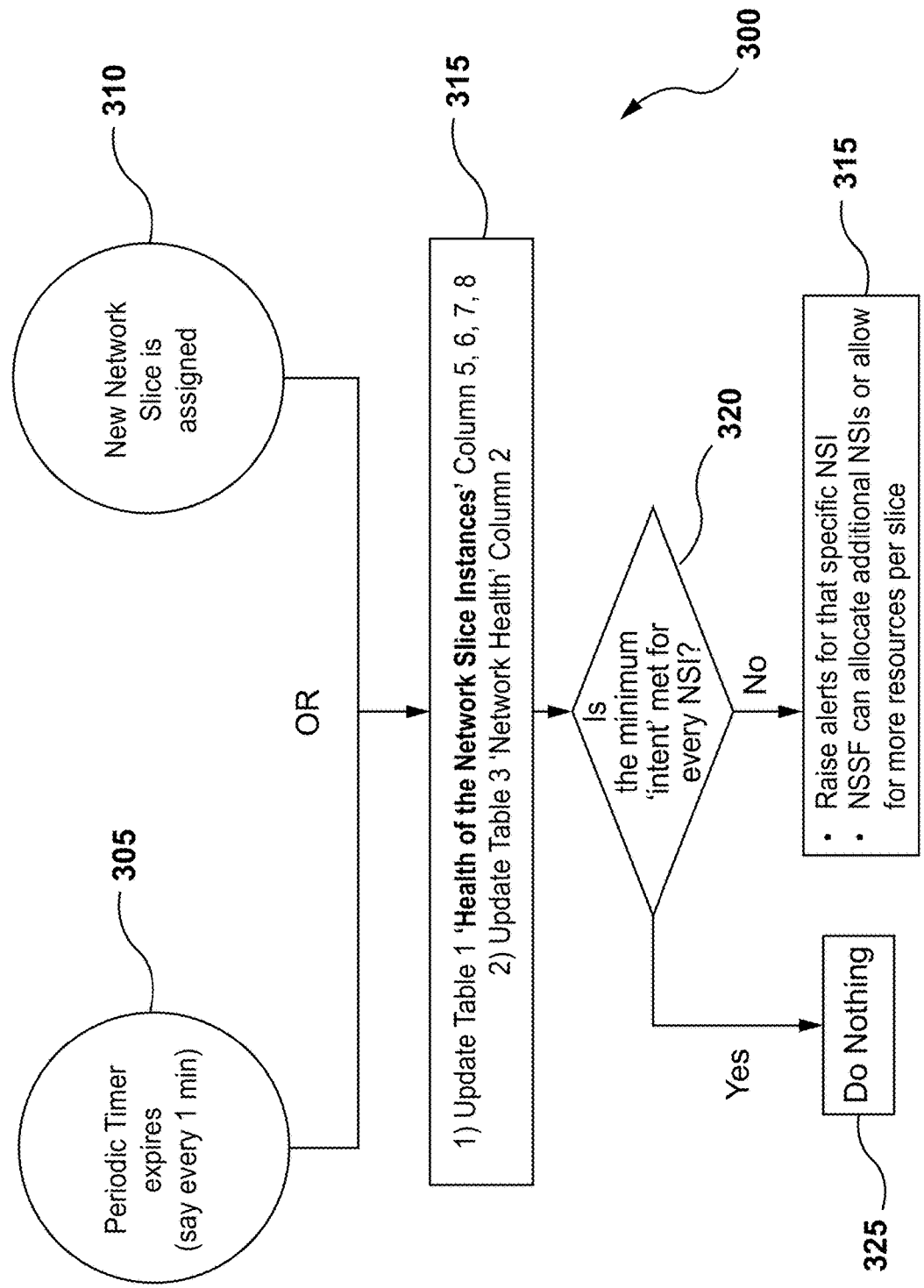
FIG. 10 is a flowchart of a method for a health check for network slice instances according to an embodiment.

FIG. 10 is a flow chart illustrating an embodiment of a method 300 for periodic health checks for the method for network slice selection. In some cases, as seen from this method, alerts are raised when the slice performance does not (or will not) meet Intent. At 305, a periodic timer can be set to measure the scores of the current NSIs. In some cases, a new network slice is also assigned at 310. The system is configured to determine the health of at least some network slices or instances as detailed herein, at 315 via, for example, the monitoring module 130 and the analysis module 120. The system is further configured to update the network health in the memory component, for example, as updates to the tables that may be similar to the tables shown in FIGS. 8 and 9, may also be invoked when a new Network Slice instance is created/assigned. The system, via the analysis module, may determine whether the minimum intent is met for each of the plurality of Network Slice Instances, at 320. If the Intent is met, the system may determine the network is providing the intention of the operator and may wait a predetermined amount of time prior to recalculating the Health of the Network Slice Instances and the Health of the Network, at 323. If not all of the Minimum Intent targets are met for each NSI, the system may be configured to raise an alert or otherwise notify the Operator of the failing NSI, at 330. In other cases, the system may allocate additional NSIs or allow for more resources per slice. In still other cases, the system, via the reprioritization module 135, may reprioritize or deprioritize at least one other slice. The process of deprioritizing a slice may be accomplished by assigning a priority level to the slices. Initially all slices may have the same priority, for example, high priority. During the network operation, it may be determined that some slices are not able to meet the scores/intent. The priorities of these slices may be downgraded to low priority. These slices may be used when all other slices, with their respective network resources, have been used up. This method is intended to be iterative and periodic.

Unused slices or NSI that have never met their intent can be removed. Unused slices may be identified by associating a counter to each slice. Each time a slice is used in a certain configurable time window, for example, 6 hours, 12 hours, 24 hours, 48 hours or the like, the counter is updated. If the counter remains zero over a few time windows, for example, over a few days in this example, this would imply that the slice is unused. A slice may be removed by removing the assignment of hardware, software, security and other resources attributable to the slice.

Figure 11:
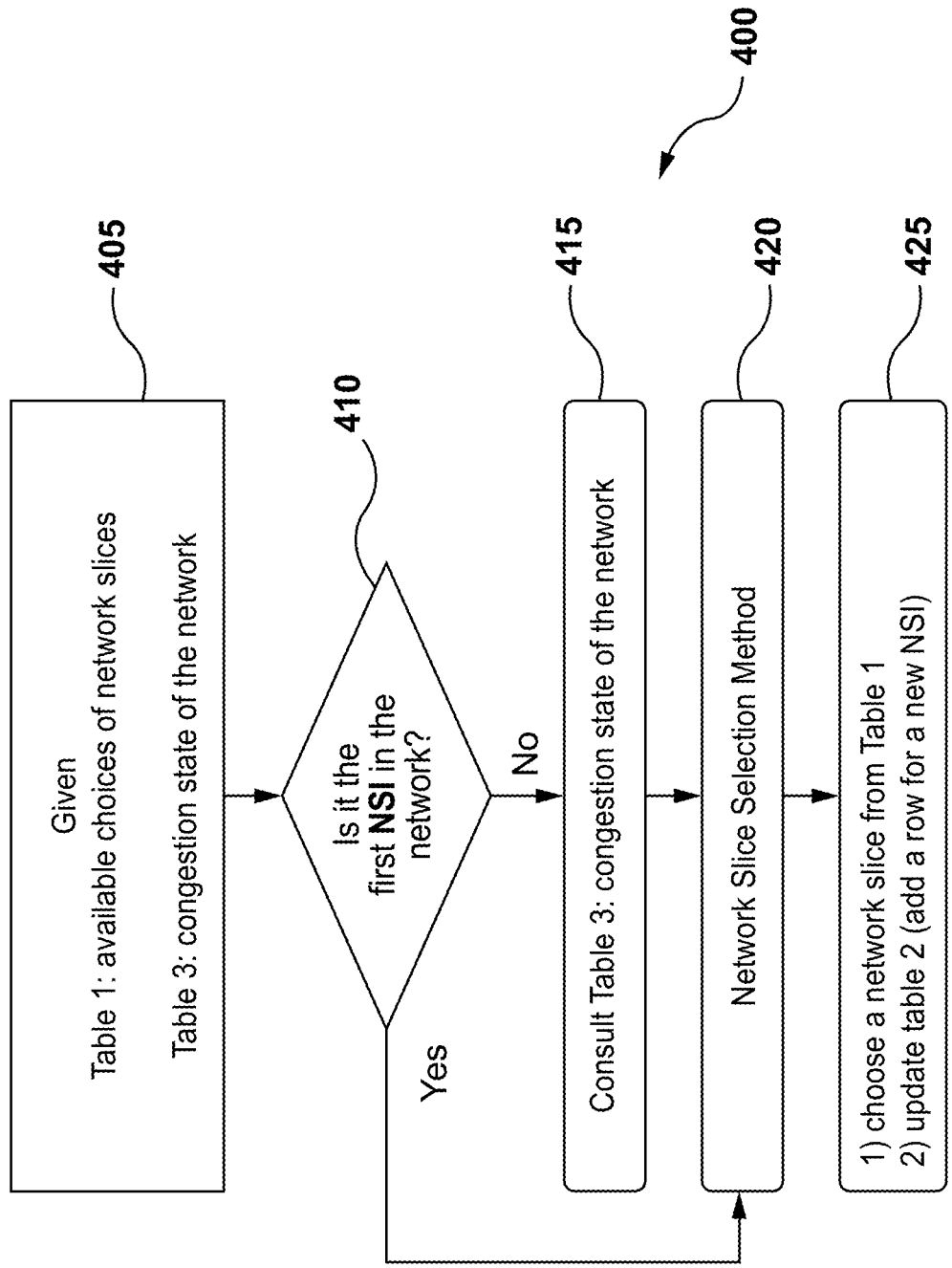
FIG. 11 is a flowchart of a method for creating a new network slice assignment according to an embodiment.

FIG. 11 is a flowchart illustrating an embodiment of a method 400 for network slice assignment. The network slice assignment system may reside in the NSSF, the NDWA or may reside on a separate device. In some cases, the Network Slice Selection Function (NSSF) may consult the Network Data Analytics (NWDA) function and assigns a Network Slice Instance.

Figure 12:
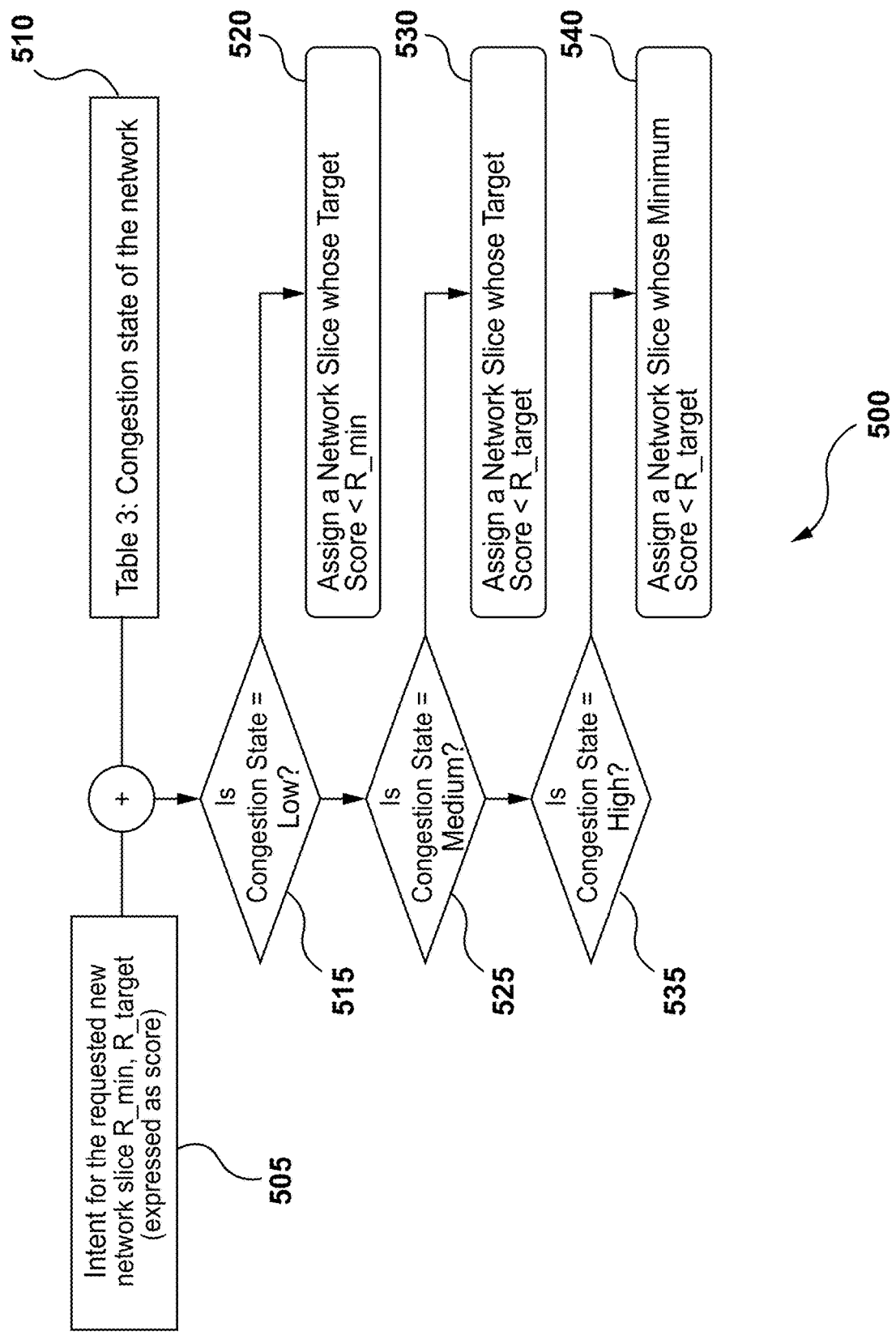
FIG. 12 is a flow chart for a method of network slice selection according to an embodiment.

The method for network slice assignment is intended to allow a new slice to be selected or configured based on how well the slice can meet the expected and intended performance objectives and in at least some cases, based on the current congestion levels in the networks. In particular, at 405, the selection module 110 is intended to review the available network choices, as shown in, for example, FIG. 7 and the current congestions state of the network, as shown in, for example, FIG. 9. If the selection module 110 determines it is the first network slice instance, at 410, the system may continue with the Network Slice Selection method 500 as shown in FIG. 12. If the system determines that the system is not the first network slice instance, the system will generally continue to consult the congestion state of the network, at 415, prior to proceeding with the method for network slice selection as shown in FIG. 12, at 420. Once the network slice selection has been determined, the selection module 110 may select the network slice from the available slices and will store the information regarding the new slice in a memory component, for example in a time as shown in FIG. 8, at 425.

FIG. 12 is a flowchart illustrating an embodiment of a method 500 for Network Slice Selection. For each incoming slice, there is an expectation of performance quantified by Minimum Score and a Target Score for that slice. In this example, these will be referred to as it R_min and R_target. In some cases, the operator may select the min and target scores based on the desired quality of experience outcome they would like to see accomplished for each of the slices and may be retrieved by the system at 505.

In this case, the system is configured to determine the current congestion state of the network, at 510. In determining the congestion state, the system will determine whether congestion is low, medium or high. If the network is not congested or it is determined that the congestion state is low, at 515, then the system is configured to identify a set of slices from one of the preexisting/preconfigured slices where R_min>Target Score of the slice and select one of these slices, at 520.

If the system determines that the network is moderately congested at 525, the system may identify a set of slices from one of the preexisting/preconfigured slices where R_target>Target Score of the slice. The system may select one of these slices, at 530.

Otherwise, if the system determines that the network is heavily congested, at 535 the system may identify a set of slices from one of the preexisting/preconfigured slices where R_target>Minimum Score of the slice. The system may then select one of these slices, at 540. In some cases, the system may also configure a slice based on the network characteristics.

After a slice is selected, the system stores the information in a memory component, for example by adding to a table such as the table shown in FIG. 8. The system may then continue to monitor the performance of the new network slice as well as each of the other network slices.

The system may also provide for Network Slice Reallocation. In some cases, the system, via monitoring, may determine that the network is only lightly or moderately congested. The system may be monitoring and may determine that an assigned network slice is consistently underperforming. The system may determine the slice is underperforming as the intent for that slice is not being met. That means that the slice had a requested R_min and an R_target, however, the measured score for that slice is below R_min. This result would imply that the resource allocation for that slice is insufficient to meet the requirements for that slice. If the system determines this issue with the network, the system may perform the method for new slice assignment as detailed herein. By periodically or continuously verifying the Intent of the Network slice, appropriate actions can be taken such as adding new slices, reassigning slices, removing slices, or the like.

The number of new slices to be added could be proportional to the number of times that the measured score is below R_min. A decision could be taken at periodic intervals of a configurable value, for example, every 5 minutes, every 10 minutes, every 30 minutes or the like, to decide if a new slice should be added. For example, if the measured slice score is below R_min say 60% of the time during the previous interval, then 60% additional network slices could be added. Conversely, if the score exceeds the intent R_target say 60% of the time, then slices may be removed. This process is intended to be heuristic and iterative and will vary with the traffic dynamics. With steady state traffic, this process may converge so that the appropriate number of slices are assigned and available to meet the slice intent.

In some cases, embodiments of the system may provide for aggregate reporting with respect to the performance of at least one network slice instance. The analysis module 120 may further aggregate measurements to determine performance analytics of the network over time. In particular, the analysis module 120 may track the performance of a network slice instance and provide aggregated analytics with respect to how the network slice instance is generally performing. It is intended that if the performance of the at least one network slice instance falls below a predetermined threshold, the system is configured to notify the network operator, or otherwise provide for an alarm and/or a reprioritization of network resources.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for network slice assignment on a network, the method comprising:
   defining an intent for at least one network slice;
   selecting at least one network slice instance having capability to meet the intent, wherein the intent defines a business objective comprising Key Performance Indicators to be delivered by the network slice;
   monitoring the selected network slice instance, over a predetermined period of time greater than one day, to determine whether the selected network slice instance is achieving the intent wherein achieving the intent comprises meeting the Key Performance Indicators and a minimum score based on a desired Quality of Experience, wherein monitoring further comprises:
   determining a health of the network slice instance as a weighted average of measured scores over an interval sliding window;
   determining a health of the network; and
   if the intent is not being met or the health of the network slice instance is lower than the health of the network, reprioritizing the selected network slice instance with regard to at least one other network slice instance;
   if the intent is being met and the health of the network slice instance is equal or greater to the health of the network, continue monitoring the selected network slice instance.

2. The method according to claim 1, wherein monitoring the selected network slice instance comprises:
   determining at least one of a maximum score and median score of the selected network slice instance; and
   comparing the at least one of the maximum score and median score to the defined intent.

3. The method according to claim 2, wherein the minimum score, maximum score and median score are determined by analyzing network performance metrics.

4. The method according to claim 3 wherein the network performance metrics comprise at least one of: Throughput, Round-Trip-Time and Loss.

5. The method according to claim 1 further comprising:
   determining a network congestion level of the network; and
   selecting the at least on network slice instance based on the network congestion level.

6. The method according to claim 1, further comprising:
   monitoring the selected network slice instance over a predetermined time interval to determine performance analytics of the selected network slice instance;

aggregating the performance analytics over the predetermined time interval;
determining whether the aggregated performance analytics are outside of a predetermined threshold; and
providing notification with respect to any aggregated performance analytics over the predetermined threshold.

7. The method according to claim 6, wherein the performance analytics measure the performance of the selected network slice instance compared to the intent for the selected network slice instance.

8. The method according to claim 1 wherein reprioritizing comprises allocating more resources to the selected network slice instance.

9. The method according to claim 1, wherein reprioritizing comprises deprioritizing the at least one other network slice instance.

10. The method according to claim 9, wherein deprioritizing at least one other network instance comprises removing the at least one network slice instance by removing the assignment of hardware, software, security and other resources attributable to the slice.

11. A system for network slice assignment on a network, the system comprising at least one processor configured to execute instructions stored in a memory component wherein the instructions provide for modules comprising:
a selection module configured to define an intent for at least one network slice and select at least one network slice instance having capability to meet the intent, wherein the intent defines a business objective comprising Key Performance Indicators to be delivered by the network slice;
a monitoring module configured to monitor the selected network slice instance, over a predetermined period of time greater than one day, to determine whether the selected network slice instance is achieving the intent wherein achieving the intent comprises meeting the Key Performance Indicators and a minimum score based on a desired Quality of Experience wherein the monitoring module is further configured to determine a health of the network slice instance as a weighted average of measured scores over an interval sliding window and determine a health of the network;
an analysis module configured to determine if the intent is not being met and if the health of the network slice is lower than the health of the network; and
a reprioritization module configured to reprioritize the selected network slice instance with regard to at least one other network slice instance based on the intent not being met or the health of the network slice is lower than the health of the network.

12. The system according to claim 11, wherein the monitoring module is configured to determine at least one of a maximum score and median score of the selected network slice instance; and
the analysis module is configured to compare the at least one of the maximum score and median score to the defined intent.

13. The system according to claim 12, wherein the at least one of minimum score, maximum score and median score are determined by analyzing network performance metrics.

14. The system according to claim 11 wherein the analysis module is further configured to determine a network congestion level of the network; and
the selection module is configured to select the at least one network slice instance based on the network congestion level.

15. The system according to claim 13 wherein the network performance metrics comprise at least one of: Throughput, Round-Trip-Time and Loss.

16. The system according to claim 11, wherein the monitoring module is further configured to monitor the selected network slice instance over a predetermined time interval to determine performance analytics of the selected network slice instance;
the analysis module is further configured to aggregate the performance analytics over the predetermined time interval and determine whether the aggregated performance analytics are above any predetermined threshold; and
the reprioritization module is configured to provide notification with respect to any aggregated performance analytics over the predetermined threshold.

17. The system according to claim 11, wherein the reprioritization module is configured to reprioritize by allocating more resources to the selected network slice instance.

18. The system according to claim 11, wherein the reprioritization module is configured to reprioritize by deprioritizing the at least one other network slice instance.

* * * * *